Patented Aug. 3, 1954

2,685,582

UNITED STATES PATENT OFFICE 2,685,582

MANUFACTURE OF DYESTUFFS

Samuel Coffey, David Alexander Whyte Fairweather, and David Ernest Hathway, Blackley, Manchester, England, assignors to Imperial Chemical Industries Limited, a corporation of Great Britain No Drawing. Application September 14, 1951, Serial No. 246,708

Claims priority, application Great Britain August 23, 1946

8 Claims. (Cl. 260—273)

This invention relates to the manufacture of dyestuffs and in particular it relates to an improved process for the manufacture of sulphuric esters of leuco derivatives of vat dyestuffs and anthraquinone dyestuff intermediates.

In British specification No. 186,057 there is described a process for the manufacture of leuco sulphuric ester derivatives of vat dyestuffs by reacting the leuco derivative of the vat dyestuff with chlorosulphonic acid in the presence of a tertiary base for example pyridine.

In British specification No. 274,156 it was proposed to make sulphuric esters of leuco derivatives of vat dyestuffs by reacting a quaternary ammonium halide which may be obtained by the reaction between a tertiary organic base and an alkyl halide, in tertiary organic base suspension, with a metal, reacting the product with a vat dyestuff, and then reacting the resulting mixture with a product obtained by the interaction of a tertiary base with a reagent adapted to yield the sulphuric anhydride compound of the tertiary base for example an alkyl chlorsulphonate, chlorsulphonic acid, oleum or sulphur trioxide. Pyridine and dimethylaniline were mentioned as examples of tertiary bases which could be used in the process.

As an improvement over these prior procedures it has been proposed in U. S. Patent 2,506,580, issued May 9, 1950, to prepare leuco sulphuric ester derivatives of vat dyestuffs by a one-stage procedure which involves treating an oxidized form of the dyestuff in the presence of a carboxylic acid amide in which the hydrogen atoms of the amide nitrogen have been replaced by hydrocarbon radicals and a metal, such as, copper, with a sulphur-trioxide liberating compound.

We have now found that still more improved results are obtained when the leuco sulphuric ester derivative is obtained by means of a two-stage procedure, rather than a one-stage procedure, involving (a) reduction of the vat dyestuff in the absence of a sulfating agent and (b) thereafter sulfating the thus previously reduced form of the dyestuff in the presence of a non-vattable organic amide selected from the group consisting of the amides of carboxylic and sulphonic acids in which the hydrogen atoms attached to the amide nitrogen atom have been replaced by hydrocarbon radicals or hydrocarbon radicals substituted with oxygen or halogen.

By using such a two-stage procedure, it has been found that better yields of sulphuric esters are obtained from vat dyestuffs and anthraquinone intermediates, and furthermore some vat dyestuffs which according to our experiments cannot be converted to the sulphuric esters of their leuco derivatives by the processes of the above-mentioned British specifications Nos. 186,057 and 274,156 and U. S. Patent 2,506,580 give excellent yields of the sulphuric esters of their leuco derivatives. Also, the reaction conditions can be more widely varied to utilize those most suitable for both reduction of the dyestuff and sulfation thereof and instead of quaternary ammonium halides, other catalysts can be used, and in some cases the reaction can be successfully carried out without a catalyst.

According to our invention therefore we provide a two-stage process for the manufacture of sulphuric esters of the leuco derivatives of vat dyestuffs and vat dyestuff intermediate compounds which comprises initially reducing the vat compound in the absence of a sulfating agent and thereafter sulfating this previously reduced form of the vat compound in the presence of a non-vattable organic amide selected from the group consisting of the amides of carboxylic and sulphonic acids in which the hydrogen atoms attached to the amide nitrogen atom have been replaced by radicals selected from the group consisting of hydrocarbon radicals, oxygen substituted hydrocarbon radicals and halogen substituted hydrocarbon radicals.

The sulfation reaction can be applied to previously prodeuced leuco derivatives or the metal salts of previously produced leuco derivatives of anthraquinone intermediates and vat dyestuffs of the anthraquinone, indigoid or thioindigoid series.

As indicated, the amides used are those derived from organic carboxylic or sulphonic acids. As examples of carboxylic and sulphonic acid amides in which the hydrogen atom or atoms of the amide nitrogen have been replaced by hydrocarbon radicals or hydrocarbon radicals substituted with oxygen and which therefore are suitable for use in the present procedure there may be mentioned dialkyl substituted amides such as: dimethyl formamide, diethyl formamide, dimethylacetamide, diethyl-p-toluenesulphonamide, dimethyl benzamide; alkyl-aryl substituted amides such as: N-methyl formanilide, N-methylacetanilide, N-butylformanilide, propionyl-N-methylanisidide, acetyl-N-ethyl-o-toluidide, p-bromobenzoyl-N-ethyl-o-toluidide and p-anisoyl-N-ethyl-toluidide, acetyl-N-ethyl-p-chloroanilide, acetyl-N-ethyl-o-chloroanilide; tetra-alkyl ureas such as tetramethyl urea; and piperidides and morpholides such as formylpiperidide, N-acetyl piperidide and N-formylmorpholide.

The sulphation may be carried out in the presence of diluents among which there may be mentioned acetone and nitrobenzene. When the amide employed is a solid at the reaction temperature used, a diluent in which the amide is soluble should preferably be added. For example, when using alkyl arylamides which are solids or viscous liquids, a liquid diluent is preferably employed, the leuco sulphuric ester being recovered by distilling off the diluent, cooling and filtering off the alkyl aryl amide if the melting point is high enough or by decanting and/or extracting with a suitable solvent, for example, chloroform or ethylene dichloride, if the amide is oily in nature.

For the sulfation, sulphur trioxide is employed or, alternatively, a substance which can behave like, or give rise to, sulphur trioxide in the reaction mixture can be used. Thus, the addition compound of sulphur trioxide with an organic amide, for example, dimethylformamide, or with a tertiary base, for example, picoline, or an ester of chlorosulphonic acid may conveniently be used. Alkyl aryl amide-sulphur trioxide addition products may be made by adding liquid sulphur trioxide into a solution of the alkyl aryl amide in ethylenedichloride and then removing the dichloride by distillation.

The sulphating agent may be added to a solution or suspension of the reduced form of the vat compound at a controlled temperature, or if desired, the suspension of the leuco compound may be added to the sulphating agent in a suitable medium. In some cases the latter method is to be preferred since better control of the reaction is thereby obtained.

The dyestuff in its reduced form as a metal salt or a complex compound comprising the metal salt, may for example be obtained by reacting the parent vat dyestuff with a metal for example zinc, iron or copper in the presence of an inert solvent and pyridine or in the presence of an organic carboxylic or sulphonic acid amide of the type hereinaboev described and preferably in the presence of a catalyst.

The particular metal and catalyst to be used to give the best results in the formation of the metal salt of the leuco compound depends on the nature of the dyestuff and the amide used in the reaction. We have found that when dimethylformamide is used as the amide with anthraquinone vat dyestuffs the best results are obtained by using zinc as the metal and an electrolyte soluble in dimethylformamide as the catalyst. When formylpiperidide is used as the amide, zinc and iron can be used successfully as the metals in the absence of a catalyst but when copper is used as the metal, a catalyst is usually necessary.

Suitable catalysts for use in the formation of the metal salt of the leuco compound are for example potassium ethyl sulphate, sodium 2-naphthol-6-sulphonate, calcium naphthalene-2:6-disulphonate, sodium β-naphthalene-sulphonate ferric chloride and magnesium chloride. However, when the alkyl aryl amides are employed for the initial step of reducing anthraquinone dyestuffs to a metal salt of the leuco compound, it is preferred to use a quaternary ammonium salt as the catalyst since the catalysts listed above are not usually sufficiently soluble in the alkyl aryl amides.

The process of the present invention is particularly valuable for the production of the leuco sulphuric esters of those vat dyestuffs and intermediates which, although readily reduced in a normal alkaline hydrosulfite vat, are surprisingly difficult to reduce with a metal in the presence of a sulphating agent and an amide.

By the process of our invention it is possible to obtain satisfactory yields of leuco sulphuric esters from such dyestuffs by first carrying out the reduction in the absence of the sulphating agent and, if desired, by using a higher temperature for the reduction than that necessary or desirable for the sulphation stage.

The sulphuric esters of leuco derivatives of vat dyestuffs made by the process of our invention are applied by the conventional methods in the printing and dyeing of textile materials.

The invention is illustrated but not limited by the following examples in which the parts are by weight.

*Example 1*

4.5 parts of finely divided 1:4-dibenzoylaminoanthraquinone, 2 parts of zinc dust and 0.164 part of potassium ethyl sulphate are added to 48 parts of dimethylformamide and the mixture is stirred in a reaction vessel the air in which has been replaced by nitrogen. The mixture is stirred at 50° C. for 30 minutes, and then cooled to 0° C. A solution of 6 parts of sulphur trioxide in 30 parts of dimethylformamide is then added and the mixture is then stirred at 0° C. for 30 minutes. To isolate the product the reaction mixture is poured into a solution of 12 parts of sodium carbonate in 300 parts of water and the suspension so obtained is filtered. The filtrate is concentrated in vacuo and the dyestuff salted out, filtered off and dried.

In place of the 0.164 part of potassium ethyl sulphate there may be used 0.6 part of sodium β-naphthalene-sulphonate, 0.6 part of sodium-2-naphthol-6-sulphonate, 1.63 parts of calcium naphthalene-2:6-disulphonate or 0.81 part of ferric chloride, and in place of the 0.164 part of potassium ethyl sulphate, 6 parts of sulphur trioxide and 30 parts of dimethylformamide there may be used 0.6 part of hydrated magnesium chloride, 8 parts of sulphur trioxide and 40 parts of dimethylformamide.

*Example 2*

4.5 parts of 1:4-dibenzoylaminoanthraquinone are added to a mixture of 48 parts of methyl ethyl ketone and 19 parts of dimethylformamide. 2 parts of zinc dust and 1 part of tetraethylammonium bromide are added and the mixture is stirred and heated to 80° C. in a reaction vessel, the air in which has been replaced by nitrogen. The mixture is stirred at 80° C. for 2 hours and then cooled to 0° C. A solution of 6 parts of sulphur trioxide in 30 parts of dimethylformamide is then added and the mixture is then stirred at 0° C. for 30 minutes. The product is then isolated as described in Example 1. The 48 parts of methyl ethyl ketone used in this example may be replaced by 50 parts of acetone.

*Example 3*

5.2 parts of 16:17-dimethoxydibenzanthrone, 2 parts of zinc dust and 0.525 part of tetraethylammonium bromide are added to 50 parts of dimethylformamide. The mixture is stirred at 80° C. for 60 minutes in a reaction vessel, the air in which has been replaced by nitrogen, when a blue solution is formed. The solution is cooled to 0° C. and a solution of 6 parts of sulphur trioxide in 30 parts of dimethylformamide is added. The mixture is stirred at 0° C. for 30 minutes and the product is then isolated as described in Example 1.

*Example 4*

1.9 parts of 6:6'-diethoxythioindigo, 1 part of zinc dust and 0.6 part of potassium ethyl sulphate are added to 30 parts of dimethylformamide and the mixture is stirred at 80° for 50 minutes in a reaction vessel the air in which has been replaced by nitrogen. The pale yellow solution so obtained is cooled to 0° C. and sulphated with a solution of sulphur trioxide in dimethylformamide as described in Example 3.

*Example 5*

9.4 parts of 2-(1-amino-2-anthraquinonyl)-anthraquinone-2':3'-oxazole, 3.2 parts of potassium methyl sulphate and 4.5 parts of zinc dust are added to 65 parts of dimethylformamide. The mixture is stirred and heated to 80–100° C. in a reaction vessel the air in which has been replaced by nitrogen. After stirring at this temperature for about ½ hour the formation of the leuco metal salt is complete and the reaction mass is then cooled to 0° C. A sulphating mixture made by reacting 31 parts of methylchlorosulphonate with 25 parts of dimethylformamide is added rapidly to the cooled solution of the leuco metal salt. The mixture is stirred for about 15 minutes and then added to a solution of 33 parts of sodium carbonate in 400 parts of water. The suspension is filtered to remove zinc residues. The filtrate which contains a 96% of theory yield of the leuco sulphuric ester, is concentrated in vacuo and the leuco sulphuric ester is salted out.

No leuco sulphuric ester is obtained when the above vat dyestuff in its oxidized form is treated with dimethylformamide, methylchlorosulphonate and a metal.

*Example 6*

To 3 parts of a mixture of 3-chloro-2-acetylamino-anthraquinone and 38 parts of dimethylformamide, there are added 2 parts of zinc dust and 0.5 part of tetraethylammonium bromide. The reaction mixture is stirred at 35° C. for 40 minutes, in a vessel through which a current of nitrogen is passed. The reaction mixture becomes red in colour. The complex comprising the metal salt of the leuco compound so obtained is sulphated by adding the product obtained by reacting 6 parts of sulphur trioxide with 28 parts of dimethylformamide and the mixture is then stirred for 30 minutes at 0° C. The reaction mixture is poured into an aqueous solution of 12 parts of sodium carbonate. The zinc carbonate is filtered off and dimethylformamide is removed from the filtrate by distillation under reduced pressure. The potassium salt of the leuco-sulphuric ester is salted out by the addition of potassium chloride at 0° C. The potassium salt is filtered off, mixed to a smooth paste with 3 parts of dextrin and 10 parts of 2 N sodium carbonate solution and dried in vacuo, the powder so obtained is pulverized if desired.

*Example 7*

2.4 parts of 2-chloroanthraquinone, 2 parts of zinc dust, 0.6 part of crystalline magnesium chloride and 24 parts of dimethylformamide are stirred together at 40° C. for 45 minutes in a vessel through which a current of nitrogen is passed. The product obtained by reacting 14.25 parts of methylchlorosulphonate with 28 parts of dimethylformamide, is then added and the mixture is stirred for 30 minutes at 0° C. The salt of the leuco-sulphuric-ester is then isolated, as described in Example 6.

*Example 8*

2.1 parts of finely divided anthraquinone, 2 parts of zinc dust, 0.6 part of sodium β-naphthalene sulphonate, and 28 parts of dimethylformamide are stirred together at 60° C. for 30 minutes in a vessel through which a current of nitrogen is passed, when a deep brownish-orange mixture is obtained. The product obtained by reacting 10.5 parts of methylchlorosulphonate with 24 parts of dimethylformamide is added and the mixture then stirred for 30 minutes. The salt of the leuco-sulphuric-ester is isolated as described in Example 6.

*Example 9*

2.1 parts of anthraquinone, 2 parts of zinc dust, 1 part of tetraethylammonium bromide and 25 parts of N-methylformanilide are stirred at 80° C. for 1 hour in a vessel through which a current of nitrogen is passed. The product obtained by reacting 10.5 parts of methylchlorosulphonate with 25 parts of N-methylformanilide is then added and the mixture stirred for 30 minutes at 0° C. The salt of the leuco-sulphuric-ester is isolated, as described in Example 6.

*Example 10*

2.4 parts of chloroanthraquinone, 2 parts of zinc dust, 0.6 part of tetramethylammonium bromide, 9.33 parts of dimethylformamide and 18 parts of benzene are heated together under a reflux condenser for 4 hours. The mixture is then cooled to 0° C. and stirred in a vessel through which a current of nitrogen is passed. The product obtained by reacting 6 parts of sulphur trioxide with 28 parts of dimethylformamide is added and the mixture stirred at 0° C. for 30 minutes. The salt of the leuco-sulphuric-ester is isolated as described in Example 6.

*Example 11*

A suspension of 1.4 parts of 9:10-dihydroxyanthracene in 20 parts of dimethylformamide is stirred at 0° C. in an inert atmosphere and 25 parts of a mixture of dimethylformamide sulphur trioxide and dimethylformamide (containing 40% of sulphur trioxide) is added. The mixture is then stirred 25 minutes. The reaction mixture is poured into 300 parts of aqueous 10% sodium carbonate solution. The suspension is filtered and the dimethylformamide removed from the filtrate by distillation in vacuo. The leuco sulphuric ester is then salted out with common salt.

In place of the dimethylformamide used in the above example there may be used tetramethylurea.

*Example 12*

50 parts of a mixture of dimethylformamide sulphur trioxide and dimethylformamide (containing 40% of sulphur trioxide) is diluted with a further 20 parts of dimethylformamide. The mixture is stirred in an inert atmosphere at 0° C. and 3.75 parts of leuco-indigo is added. The reaction mixture is stirred for 30 minutes and then poured into 400 parts of aqueous 10% sodium carbonate solution. The dimethylformamide is removed by distillation in vacuo, and the leuco-sulphuric ester salted out by the addition of common salt.

*Example 13*

A mixture of 30 parts of dimethylformamide sulphur trioxide and dimethylformamide (containing 40% of sulphur trioxide) is diluted with a further 20 parts of dimethylformamide. The mixture is stirred at 0° C. under an atmosphere of nitrogen and 5.2 parts of leuco-16:17-dimethoxydibenzanthrone is added. The claret colored solution so formed is stirred for 30 minutes and then poured into 500 parts of aqueous 8% sodium carbonate solution. The suspension is filtered and the dimethylformamide removed from the filtrate by distillation in vacuo. The leuco sulphuric ester is then salted out with common salt.

*Example 14*

5 parts of N:N-diethyl-p-toluenesulphonamide are dissolved in 38 parts of ethylene dichloride. 4.6 parts of 4:10-dibromoanthanthrone, 2 parts of zinc dust and 1 part of tetraethylammonium chloride are added. The mixture is stirred in an atmosphere of nitrogen at 50-60° C. until reduction is complete. This takes about an hour. The purple-brown leuco salt suspension is sulphated by the addition at 0-5° C. of a solution of N:N-diethyl-p-toluenesulphonamide sulphur trioxide, made by adding 4.8 parts of sulphur trioxide to a solution of 15 parts of N:N-diethyl-p-toluenesulphonamide in 20 parts of ethylene dichloride. Sulphation takes place rapidly and after stirring for one-half hour the product is run into a solution of 10 parts of sodium carbonate in 200 parts of water. The ethylene dichloride is distilled off and the leuco sulphuric ester isolated in the usual manner.

*Example 15*

A mixture of 120 parts of 1:4-dibenzoylaminoanthraquinone, 80 parts of zinc dust and 5.2 parts of potassium methyl sulphate is charged during a period of about 5-10 minutes to 200 parts of dimethylformamide while stirring under an inert atmosphere. The mixture is heated to 50° C. and stirred at this temperature for one and one-half hours when a thin dull bluish red mixture is obtained.

The mixture so obtained is then run slowly during about 1 hour into 212 parts of a suspension of dimethylformamide sulphur trioxide in dimethylformamide (containing 40% sulphur trioxide) which is cooled to 0-5° C. and stirred in an inert atmosphere. When the addition is complete, the mixture is stirred for 15 minutes at 0-5° C. and then run into 5000 parts of 4% sodium carbonate solution. The zinc residues are filtered off and washed and the product is salted out from the filtrate and washings (10,000 parts) by adding 2500 parts of common salt over a period of about 1 hour. The salted liquor is stirred for a few hours to complete precipitation and the yellow crystalline solid is filtered off and washed with brine.

*Example 16*

5 parts of 16:17-dimethoxydibenzanthrone, 2 parts of zinc and 1 part of tetraethylammonium chloride are added to 55 parts of N:N-dimethylbenzamide. The mixture is stirred for 1 hour at 80° C. in a reaction vessel the air in which has been replaced by nitrogen, when a blue solution is obtained. The solution is cooled to 40° C. and the reaction product of 21 parts of methylchlorosulphonate and 30 parts of dimethylbenzamide is added. The mixture is stirred at 40° C. for 30 minutes and the product isolated in the usual manner.

*Example 17*

4.5 parts of 1:4-dibenzoylaminoanthraquinone, 2 parts of zinc, 1 part of tetraethylammonium bromide and 40 parts of N-formylmorpholide are stirred under an atmosphere of nitrogen for 1 hour at 80° C. The deep colored solution is cooled to 20° C. and the reaction product of 21 parts of methylchlorosulphonate and 40 parts of N-formylmorpholide is added. The mixture is stirred at 20° C. for 1 hour, and the product isolated as described in Example 1.

*Example 18*

5.4 parts of 4:10-dibromoanthanthrone, 2 parts of zinc and 1 part of sodium 2-naphthalene sulphonate are added to 50 parts of dimethylformamide. The mixture is stirred for 1 hour at 65° C. under nitrogen, when a purple solution is formed. The solution is cooled to 0° C. and 30 parts of a suspension of dimethylformamide sulphur trioxide in dimethylformamide (containing 40% sulphur trioxide) is added. The mixture is stirred at 0° C. for 30 minutes, and the product is poured into 1200 parts of aqueous 2.5% sodium carbonate solution. The zinc carbonate residue is removed and extracted with warm water. The lemon colored sodium salt of the leuco sulphuric ester is salted out from the bulked filtrates by the addition of common salt, filtered off and washed with aqueous 10% sodium carbonate solution saturated with common salt. This filter cake is mixed with dextrin and dried in vacuo to give a stable yellow powder.

*Example 19*

6.5 parts of 1:1':4:1''-trianthrimide-2:2'3:2''-dicarbazole, 0.3 part of potassium methyl sulphate, 4.5 parts of zinc, 10 parts of dimethylformamide and 25 parts of α:β-dichloroethane are stirred at 20° C. under an atmosphere of nitrogen for 17 hours. The dark brown solution is cooled to 0° C., when 23 parts of a suspension of dimethylformamide sulphur trioxide in dimethylformamide (containing 40% sulphur trioxide) is added. The α:β-dichloroethane is removed by distillation under diminished pressure. The reaction product is poured into 300 parts of aqueous 10% sodium carbonate solution, the zinc carbonate residue filtered off and the potassium salt of the leuco sulphuric ester is salted out by adding to the filtrate potassium chloride (25% of the weight of the filtrate) and potassium carbonate (5% of the weight of the filtrate). The leuco sulphuric ester is removed, washed with aqueous 10% potassium carbonate saturated with potassium chloride, made into a smooth paste with dextrin, and dried in vacuo.

The yield of the leuco sulphuric ester is 82% of theory. When the oxidized form of the above dyestuff is treated in dimethylformamide with dimethylformamide sulphur trioxide and a metal, the yield of leuco sulphuric ester isolated is 53% of theory.

*Example 20*

18.8 parts of 2-(1-amino-2-anthraquinonyl) anthraquinone-2':3'-oxazole, 4 parts of sodium 2-naphthalene sulphonate, 15.6 parts of zinc, 42 parts of dimethylformamide and 50 parts of benzene are stirred at 70° C. under an atmosphere of nitrogen for 5 hours. The solution is cooled to 10° C. when 62 parts of a suspension of dimethylformamide sulphur trioxide in dimethylformamide (containing 42% of sulphur trioxide) is added. After 30 minutes' stirring the product is poured into a mixture of 500 parts of aqueous 12% sodium carbonate solution and 100 parts of ice. The benzene is removed by distillation under reduced pressure, the zinc carbonate is

Example 21

3 parts of anthraquinonyl-1-urethane, 2 parts of zinc and 1 part of sodium 2-naphthalene sulphonate are added to 30 parts of dimethylformamide. The mixture is stirred at 60° C. under an atmosphere of nitrogen for 30 minutes, and then cooled to 0° C. 30 parts of a suspension of dimethylformamide sulphur trioxide in dimethylformamide (containing 40% of sulphur trioxide) is added, and the resulting green mixture is stirred at 0° C. for 15 minutes. The potassium salt of the leuco sulphuric ester is isolated as described in Example 6.

Example 22

2.2 parts of 1:1'-dianthrimide, 2 parts of zinc and 0.8 part of sodium 2-naphthalene sulphonate are added to 60 parts of N-formylmorpholide. The mixture is stirred at 60° C. under an atmosphere of nitrogen for 30 minutes, and then cooled to 20° C. The reaction product of 21 parts of methylchlorosulphonate and 40 parts of N-formylmorpholide is added, and the brown solution stirred at 20° C. for 15 minutes, when the salt of the leuco sulphuric ester is isolated as described in Example 6.

Example 23

The reaction product of 12 parts of methylchlorosulphonate and 40 parts of N-formylmorpholide is stirred at 20° C. under an atmosphere of nitrogen and 5 parts of leuco-16:17-dimethoxydibenzanthrone are added. The claret colored solution so formed is stirred at 20° C. for 45 minutes and then poured into 500 parts of aqueous 10% sodium carbonate solution. The leuco sulphuric ester is isolated as in Example 13.

In place of the 40 parts of N-formylmorpholide there may be used 40 parts of N-formylpiperidide or 40 parts of N-acetylpiperidide.

Example 24

A mixture of 30 parts of dimethylformamide sulphur trioxide and dimethylformamide (containing 40% of sulphur trioxide) is diluted with a further 20 parts of dimethylformamide. The mixture is stirred at 0° C. under an atmosphere of nitrogen and 4.1 parts of leuco flavanthrone are added. Stirring is continued for 1 hour, when the reaction product is poured into aqueous 10% sodium carbonate solution. The disulphate ester of leuco flavanthrone is isolated by vacuum distillation and salting.

Example 25

4.5 parts of 1:4-dibenzoylaminoanthraquinone, 25 parts of N-methylacetanilide, 25 parts of chlorobenzene, 1 part of methyltriethylammonium chloride, and 2 parts of zinc dust are stirred in an inert atmosphere at 60–70° C. until the dyestuff is completely reduced. This takes about 4 hours. The mixture is then cooled to 0° C. and 14 parts of N-methylacetanilide sulphur trioxide are added. The mixture is stirred at 0–5° C. for one-half hour and it is then run into a solution of 8 parts of sodium carbonate in 200 parts of water. The chlorobenzene is distilled off in vacuo and the residual material, after addition of water, if necessary, is filtered from zinc residues and N-methylacetanilide.

The yellow solution of the leuco sulphuric ester is salted out from the filtrate, filtered off and dried.

Example 26

To 20 parts of N-methylbenzanilide and 25 parts of benzene there are added 1 part of methyltriethylammonium chloride, 4.6 parts of 4:10-dibromoanthanthrone and 2 parts of zinc dust. This mixture is stirred in an atmosphere of nitrogen for one and one-half hours at 70° C., and then cooled to 0° C. in an ice bath. 17 parts of N-methylbenzanilide sulphur trioxide are added, and stirring is continued at 0° C. for one-half hour. The yellowish reaction mixture thus obtained is then run into 240 parts of 5% sodium carbonate solution and the benzene is distilled off under reduced pressure. Hot water is added and the mixture is filtered. The yellow solution of the leuco sulphuric ester is separated from any residual methylbenzanilide, and the dyestuff is salted out.

Example 27

25 parts of p-anisoyl-N-ethyl-o-toluidide are mixed with 25 parts of chlorobenzene and to this mixture there are added 1.2 parts of tetraethylammonium chloride, 3 parts of thioindigo, and 2 parts of zinc dust. The mixture is stirred for about two hours at 70° C. in a nitrogen atmosphere, when reduction is complete. The pale yellow-brown solution thus obtained is cooled to 0° C. and 22 parts of p-anisoyl-N-ethyl-o-toluidide, sulphur trioxide are added. The mixture is stirred at 0° C. for one-half hour. The leuco sulphuric ester is isolated as described in Example 25.

Example 28

To a suspension of 3.85 parts of 6:6'-diethoxythioindigo in 40 parts of N-butylformanilide there are added 1 part of methyltriethylammonium chloride and 1.5 parts of zinc dust. The mixture is stirred at 80° C. in an atmosphere of nitrogen, until a pale yellow solution is obtained. This takes about one hour. The pale yellow solution is cooled to 0° C. and the reaction product of 21 parts of N-butylformanilide with 7.8 parts of methylchlorosulphonate is added. The sulphation mixture is stirred for one-half hour and it is then run into sodium carbonate solution. The N-butylformanilide which separates out is removed and the leuco ester salt is isolated from the aqueous solution by concentration and salting.

Example 29

30 parts of propionyl-N-methylanisidide, 20 parts of methylethylketone, 2.35 parts of 2-(1-amino-2-anthraquinonyl) anthraquinone-2':3'-oxazole, 2 parts of zinc dust and 1.2 parts of tetraethyl-ammonium chloride are stirred together in a nitrogen atmosphere at 80° C. until reduction is complete. This takes about two hours. The reaction mixture is then cooled to 0° C. and there is added a sulphating mixture obtained by the interaction of 8.6 parts of ethylchlorosulphonate and 23 parts of propionyl-N-methyl-anisidine in 10 parts of methylethylketone. Sulphation is completed by stirring the mixture for one-half hour at 5–10° C. and the leuco sulphuric ester is isolated by running the mixture into 250 parts of water containing 12 parts of sodium carbonate, removing the methylethylketone by distillation in vacuo, filtering, and salting out the dyestuff from the filtrates with common salt.

Example 30

5.2 parts of 16:17-dimethoxydibenzanthrone are added to 25 parts of acetyl-N-ethyl-o-toluidide and 20 parts of methylethylketone. There are then added 0.5 part of methyltriethylammonium chloride and 2 parts of zinc dust and the mixture is stirred and heated in a nitrogen atmosphere at 80° C. for two hours. The bluish-red mixture so obtained is cooled to 0° C. and 20 parts of the sulphur trioxide addition compound of acetyl-N-ethyl-o-toluidide are added. The mixture is stirred for 30 minutes at 0°–5° C. and then run into 240 parts of 5% sodium carbonate solution. The methylethylketone is removed by distilling in vacuo. The acetyl N-ethyl-o-toluidide is recovered by extraction with benzene and the leuco sulphuric ester is salted out from the aqueous solution. Acetyl - N - ethyl-p-chloroanilide may be used in the above example instead of the o-toluidide.

Example 31

3 parts of 2-chloro-3-acetylaminoanthraquinone are added to 20 parts of p-bromobenzoyl-N-ethyl-o-toluidide and 20 parts of toluene. 1 part of methyltriethylammonium chloride, and 2 parts of zinc dust are added and the mixture is stirred in an inert atmosphere at 80–85° C. for one hour. The mixture so obtained, which is bluish-red in color, is cooled to 10° C. and 30 parts of the sulphur trioxide addition compound of p-bromobenzoyl-N-ethyl-o-toluidide are added. Sulphation is completed by stirring the mixture for about 30 minutes at 10° C. and the mixture is then run into dilute sodium carbonate solution. The toluene is distilled off under reduced pressure, and the residual p-bromobenzoyl-N-ethyl-o-toluidide and zinc are removed by filtration. The leuco sulphuric ester is salted out from the concentrated solution by means of potassium chloride.

Example 32

3 parts of thioindigo are added to 25 parts of p-anisoyl-N-ethyl-o-toluidide and 25 parts of chlorobenzene, 2 parts of zinc dust and 1.2 parts of tetraethylammonium chloride are then added. The mixture is stirred in a nitrogen atmosphere at 58–60° C. until reduction is complete as shown by the disappearance of the red color of the dyestuff. The pale yellow-brown solution is cooled to 0° C. and 22 parts of the sulphur trioxide addition compound of p-anisoyl-N-ethyl-toluidide are added. The reaction mixture is stirred at 5–10° C. for 30 minutes and then run into dilute sodium carbonate solution. The chlorobenzene is removed by distillation in vacuo, and the aqueous solution of the leuco sulphuric ester is decanted from the oily residue. The dyestuff is isolated by salting out with common salt.

Example 33

A suspension of 9 parts of 1:5-dibenzoylaminoanthraquinone, 2 parts of sodium β-naphthalene sulphonate and 4 parts of zinc in 70 parts of dimethylformamide is stirred at 65–70° C. for 120 minutes under an inert atmosphere. 40 parts of a suspension of dimethylformamide sulphur trioxide in dimethylformamide (containing 40% of sulphur trioxide) are added and the mixture stirred for 30 minutes when a green solution is obtained. The reaction mixture is poured into 500 parts of aqueous 10% sodium carbonate solution, the zinc carbonate removed by filtration and the leuco sulphuric ester is isolated by concentrating the filtrate and distilling off the dimethylformamide in vacuo and then salting out by the addition of common salt.

When the oxidized form of the above dyestuff is treated in dimethylformamide with dimethylformamide sulphur trioxide and a metal, no leuco sulphuric ester can be isolated from the reaction mixture.

The present application constitutes a continuation-in-part of our copending application Serial No. 770,196 filed August 22, 1947, now abandoned.

We claim:

1. A two-stage process for the production of a leuco sulphuric ester of anthraquinine vat dyestuffs and anthraquinone vat dyestuff intermediate compounds which comprises initially reducing the vat compound in the absence of a sulfating agent by reacting the vat compound with zinc in the presence of a non-vattable organic amide having the formula

wherein R is selected from the group consisting of carboxylic and sulphonic acids, and wherein $R_1$ and $R_2$ are selected from the group consisting of lower alkyl radicals, monocyclic aryl radicals, oxygen and halogen substituted derivatives thereof and lower alkyl radicals joined together to form a heterocyclic ring, and thereafter sulfating this reduced form of the vat compound again in the presence of said non-vattable organic amide with a sulphur compound whch gives rise to sulphur trioxide in the mixture.

2. The two-stage process of claim 1 wherein said non-vattable organic amide is a monocarboxylic acid amide.

3. The two-stage process of claim 1 wherein said non-vattable organic amide is a monocardboxylic acid amide in which the hydrogen atoms of the amide nitrogen have been replaced by lower alkyl groups.

4. The two-stage process of claim 3 wherein said amide is dimethylformamide.

5. The two-stage process of claim 1 wherein said non-vattable organic amide is a monocarboxylic acid amide in which the hydrogen atoms attached to the amide nitrogen are replaced by lower alkyl and monocyclic aryl groups.

6. The two-stage process of claim 1 wherein said non-vattable organic amide is a piperidide of a monocarboxylic acid.

7. The two stage process of claim 1 wherein said non-vattable organic amide is a morpholide of a monocarboxylic acid.

8. The two-stage process of claim 1 wherein the reduced vat compound is sulfated by treatment with an addition compound of sulphur trioxide and said non-vattable organic amide.

References Cited in the file of this patent

UNITED STATES PATENTS

| Number | Name | Date |
|---|---|---|
| 1,784,379 | Munch | Dec. 9, 1930 |
| 1,879,028 | Bauer et al. | Sept. 27, 1932 |
| 2,506,580 | Coffey et al. | May 9, 1950 |

FOREIGN PATENTS

| Number | Country | Date |
|---|---|---|
| 310,437 | Great Britain | Jan. 21, 1928 |